Figure 1:
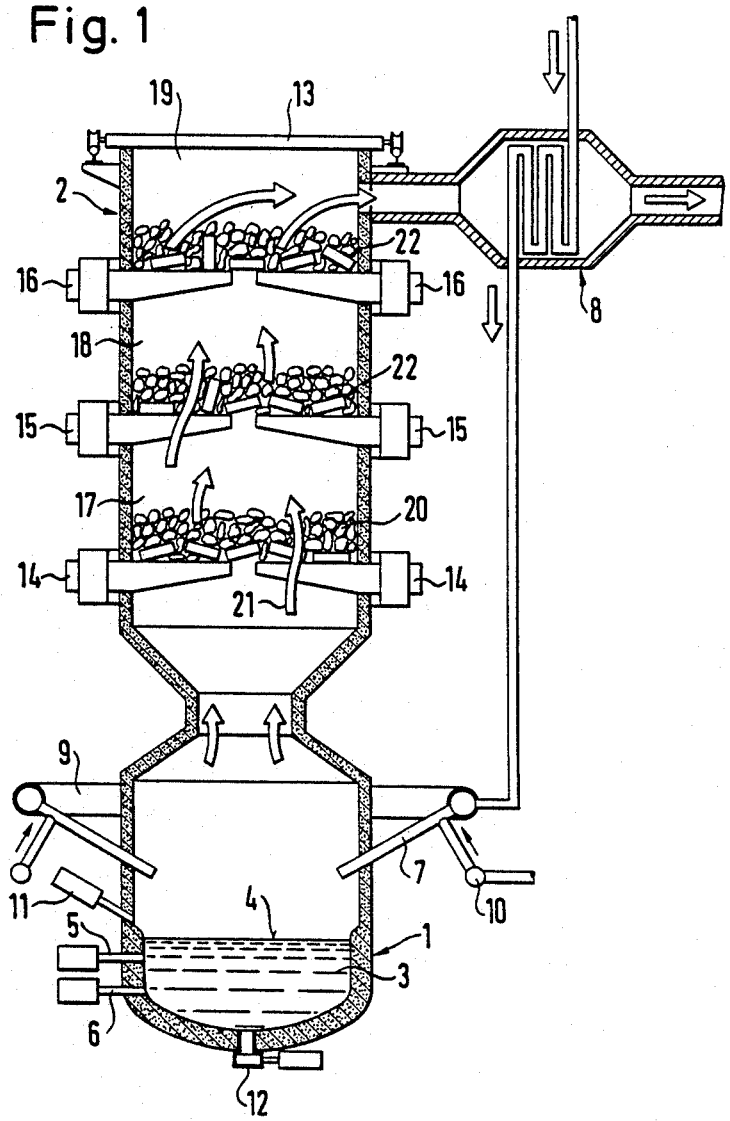

United States Patent [19]

Weber et al.

[11] Patent Number: 4,881,972
[45] Date of Patent: Nov. 21, 1989

[54] PROCESS FOR FEEDING HEAT ENERGY INTO A MOLTEN METAL BATH

[75] Inventors: Ralph G. Weber, Rio de Janeiro; William Wells, Sao Paulo, both of Brazil

[73] Assignee: Kortec AG, Switzerland

[21] Appl. No.: 257,847

[22] Filed: Oct. 14, 1988

[30] Foreign Application Priority Data

Oct. 16, 1987 [DE] Fed. Rep. of Germany ....... 3735150

[51] Int. Cl.$^4$ .............................................. C22B 9/00
[52] U.S. Cl. ...................................... 75/93 G; 75/53; 75/58
[58] Field of Search ..................... 75/93 G, 49, 53, 58

[56] References Cited

U.S. PATENT DOCUMENTS

| | | | |
|---|---|---|---|
| 2,154,613 | 8/1936 | Guthrie | 75/93 G |
| 2,397,418 | 3/1946 | Howard | 75/93 G |
| 4,060,407 | 11/1977 | Jackman | 75/93 G |
| 4,365,992 | 12/1982 | Sieckman | 75/51.6 |
| 4,430,117 | 2/1984 | Spenceley | 75/51.5 |
| 4,537,629 | 8/1985 | Lazcano-Navarro | 75/51.6 |

Primary Examiner—Peter D. Rosenberg

[57] ABSTRACT

Solid carbon and solid metal materials, preferably scrap, which are to be melted, are introduced into a crucible which accommodates a molten metal bath, and oxygen is blown into the molten metal through nozzles or lances. Better utilisation of the carbon is achieved by the carbon being charged into the crucible in the condition of being packed in sheet metal containers, the sheet metal containers being pressed into the molten bath by solid metal materials lying thereupon when the oxygen is injected.

23 Claims, 1 Drawing Sheet

U.S. Patent

Nov. 21, 1989

4,881,972

PROCESS FOR FEEDING HEAT ENERGY INTO A MOLTEN METAL BATH

DESCRIPTION

The invention relates to a process for feeding heat energy into a molten iron bath wherein solid carbon and solid metal materials which are to be melted down, preferably steel scrap, are introduced into a melting crucible which accommodates the molten metal bath, and oxygen is blown through at least one nozzle and/or at least one lance into residual molten metal which has remained in the crucible or into a molten metal bath which has been charged into the crucible.

In the process of that kind, which is disclosed in the journal MBM—Metal Bulletin Monthly—October 1986, pages 47 to 51, solid carbon is blown into a molten metal bath by under-bath nozzles.

The combustion of solid carbon which is injected in that way, with corresponding amounts of oxygen, does not produce a substantially gain in the amount of usable heat in the molten iron bath as the reaction heat which is generated when combustion takes place approximately corresponds to the heat required for heating up the reaction gas of the combustion step—essentially CO—to the temperature of the molten iron bath. Therefore in the known process the CO-bearing reaction gases issuing from the molten iron bath are subjected to post-combustion and are then passed through a charging material preheated arranged above the crucible, in order there to heat the iron materials which are to be melted down to temperatures above 850° C. before they are loaded into the crucible, i.e. into the melting vessel.

That makes it possible substantially to improve the overall level of thermal efficiency.

German published specification (DE-AS) No. 28 38 983 discloses a process of the kind set forth in the opening part, wherein oxygen is additionally blown on to the surface of the bath in the form of a free jet. In that way, the heat which is produced upon post-combustion of the carbon monoxide in the gas space can be restored to the molten bath again and the scrap charge can be increased.

German laid-open application (DE-OS) No. 27 37 441 describes a process for continuously heating a molten iron bath which is preferably produced from scrap, wherein the molten iron bath flows into a heating chamber which is separate from the crucible but which is in direct communication therewith and solid carbon and oxygen are fed to the molten metal in the heating chamber. In that arrangement the carbon may pass into the molten bath beneath the surface thereof in the form of a displaceable shaped body, for example an electrode which can be fed into the bath, or it may also be introduced, preferably in the form of lump coke, through a shaft which terminates above or below the surface of the bath. In that case the column of coke is preheated by the hot reaction gases from the heating chamber.

German laid-open application (DE-OS) No. 29 33 133 discloses a process for adding in particular finely divided additive material to a molten metal bath, in particular a molten steel bath, wherein the additive material is vacuum packed in a condition of being free of binding agent, in a sheet metal cask, and is added in that form to the molten metal bath. The additive material may be alloying additives for adjusting the composition of the molten metal bath, that is to say, in the case of molten steel baths, for example ferro-alloys, sulphur, coal, ores and aluminium for killing purposes. As the granulate additive material is disposed vacuum-packed in a sheet metal cask or container, when the container melts the molten material is drawn in between the particles and the result is thus particularly good contact between the molten material and the additive material.

The object of the present invention, in a process as set forth in the first paragraph, is to increase the supply of heat to the molten bath and thus to make it possible to melt a higher proportion of solid metal materials, in particular solid iron materials.

That object is achieved by charging carbon into the crucible in a condition of being disposed in sheet metal containers, wherein the material of the sheet metal is so selected that its melting point lies in the temperature range in which the metal materials to be melted melt down, the sheet metal container being pressed downwardly into the molten metal bath by solid metal materials lying thereupon, when the oxygen is injected.

The invention is based on the following notions:

The carbon which is introduced into the crucible for the feed of heat energy is to be dissolved as completely as possible in the bath, that is to say, it is to be converted into $Fe_3C$, in order to provide for direct conversion of energy in the bath, with the oxygen which is blown into the molten bath through under-bath nozzles or through lances or nozzles which are directed on to the surface of the bath, thereby to achieve better utilisation of the coal. Dissolution of the carbon in the bath is dependent inter alia on the carbon content of the molten bath, the temperature of the molten bath, the temperature of the coal which is brought into contact with the molten material, and the coal-molten material contact time.

If coal coal is injected into a molten steel bath by means of a carrier gas through under-bath nozzles, then even at high temperature and with a low carbon content in the molten bath, that is to say, under conditions which on the basis of the iron-carbon diagram lead to the expectation of the carbon being rapidly dissolved, only a part of the injected carbon is dissolved. The carbon is conveyed upwardly at an accelerated rate with the carrier gas and during the short residence time in the bath, in the region of the flow of carbon, the bath is locally cooled down severely and the carbon content of the bath is increased at that point, that is to say, solubility is reduced in the region of the flow of carbon. The result is that a substantial part of the coal leaves the bath without reacting with the iron.

In the process according to the invention, the carbon which is disposed in the sheet metal containers which are loaded into the crucible is not brought into contact with the molten metal immediately but only when the sheet metal container in question has melted through. By virtue of the choice of sheet metal material and the gauge thereof, it is possible to control the time at which the carbon comes into contact with the molten bath after the commencement of the operation of injecting oxygen, so that it is also possible to control the molten bath condition for good solubility of the carbon in the bath, namely a sufficiently low carbon content and a sufficiently high temperature. At the same time however, until the sheet metal container is melted through, the carbon in the container is heated up to almost the melting temperature of its sheet metal casing so that, at the time at which it is brought into contact with a bath exhibiting the desired dissolution conditions, it is almost at the temperature of that bath and does not produce any cooling effect at that point. That is important for example when dissolving carbon in a steel bath, for the reason that the specific calorific capacity of carbon, at the temperatures in question, is about twice that of the molten steel bath.

Finally, in the process according to the invention, in comparison with the injection of coal, the contact time between the coal and the molten metal is also substantially increased after the container has melted as the upward-lifting bouyancy effect due to gases is eliminated and the pieces or particles of carbon are possibly pressed downwardly by steel scrap applying a loading thereto, and because they have covered a long distance from the bottom of the crucible to the surface of the bath.

When the coal comes into contact with the molten metal, it is necessary to ensure that it is free of water. If sealed sheet metal containers are used, they must not contain moisture. When using gaspervious sheet metal containers, they must be preheated prior to being immersed in the molten bath in order to drive out at least the water vapour but also as far as possible other volatile constituents which increase the buoyancy effect. They must therefore be preheated at least to a temperature of over 100° C. The preheating operation may be performed in the crucible itself as long as there is no molten metal therein, or it may be effected in a separate vessel, for example a charging material preheater. In an operation of preheating to higher temperatures inside or outside the crucible, the molten metal material may be supplied not only with the chemical heat of reaction of the solid carbon, but also the sensible heat, and that is particularly advantageous, having regard to the high specific calorific capacity of the coal, in comparison with the molten metal. Preferably the sheet metal containers which contain the carbon are heated prior to being introduced into the crucible in a charging material preheater through which are passed the hot waste gases from the crucible during a preceding smelting process.

It will be appreciated that, particularly when using under-bath nozzles, care must be taken to ensure that the containers do not come to lie directly in front of an oxygen nozzle in the charging operation as otherwise they can be prematurely melted due to the oxygen injected through the nozzle. In the case of a bottom-blowing converter therefore the oxygen nozzles are either to be arranged at one side or operated at one side and the containers containing the carbon are to be charged into the converter at a position which is away from the direct area of action of the jet of oxygen.

As the choice of the material used and the gauge of the sheet metal containers make it possible to control the time at which the carbon comes into contact with the molten bath after the oxygen injection operation is begun, it may be advantageous, in relation to a charge, to use sheet metal containers consisting of materials with different melting temperatures such as steel sheets with different carbon contents, of different gauge and possibly of different sizes, in order to provide that the process for dissolving the coal in the molten metal bath takes place in the desired fashion.

The process for feeding heat energy into a molten metal bath may be used, having regard to the specified conditions, in the form of a one-stage or multi-stage process, in LD-converters, bottom-blowing converters, Siemens-Martin furnaces, electric arc furnaces or other melting crucibles or vessels in which oxygen is injected into the molten metal bath. It is particularly suitable however for use in connection with what is known as the EOF-process, as described in the journal MBM—Metal Bulletin Monthly—October 1986, pages 47–51.

Figure 2:
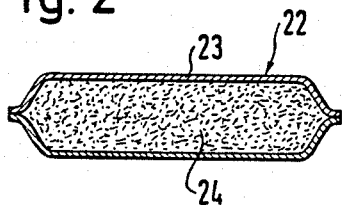

The invention will now be described in greater detail by means of an embodiment with reference to two Figures in which:

FIG. 1 is a diagrammatic view in longitudinal section of a melting crucible with a charging material preheater disposed thereon; and FIG. 2 shows a carbon-containing sheet metal container.

FIG. 1 shows a melting crucible or vessel 1 with a charging material preheater 2 disposed thereabove. The crucible 1 accommodates a molten iron bath 3. The level of the molten bath is indicated at 4. Below the surface 4 of the bath, under-bath nozzles 5 open into the crucible 1 for injecting oxygen while solids nozzles 6 similarly open into the crucible 1 for injecting solid materials such as powdered coal or additives, by means of a carrier gas. Further nozzles 7 open into the crucible 1 above the surface 4 of the bath for injecting air which is preheated in a heat exchanger 8 and which can be supplied by way of a ring conduit 9, and for injecting oxygen which can be introduced by way of a ring conduit 10. Burners 11 are also provided above the surface 4 of the bath. Disposed in the bottom of the crucible 1 is a tapping device 12 in the form of a slider.

The charging material preheated 2 is in the form of a container which can be closed at the top by a horizontally movable cover 13. The container is subdivided into three preheating sections 17, 18 and 19 which are disposed in mutually superposed relationship, by grid portions 14, 15 and 16 which are movable by an actuating arrangement between a closed position in which they project into the interior of the container (that is the position illustrated) and an open position in which they are retracted from the interior of the container. The charging material is accommodated in the preheating sections and the hot waste gases from the crucible 1 flow therethrough and thus heat it, as indicated by the arrows 21. The charging material 20 substantially comprises solid iron materials such as steel scrap which are to be melted into the bath. Disposed beneath the solid iron materials in the individual preheating sections are sheet steel containers 22 which are filled with coal.

FIG. 2 is a view in section and on an enlarged scale of such a sheet steel container 22. The sheet steel casing is indicated by reference numeral 23 and the content thereof which substantially comprises coal in grain form is indicated by reference numeral 24. Elements of that kind may be produced for example by filling a steel tube with coal in grain form, which is possibly mixed with an organic binding agent such as tar or molasses and by squeezing together and cutting up the steel tube to produce the carbon-filled sheet metal container of the desired length. In that connection the closure at the ends of the respective container is to be gas-permeable so that when the encased coal briquette described is heated, gases and in particular moisture can escape. Special gas apertures may possibly be provided in the sheet steel casing. The encased coal briquettes may also contain alloying additives such as ferrosilicon.

Described hereinafter by way of example is an operating procedure using the apparatus illustrated in FIG. 1.

After tapping of the molten steel bath formed in the crucible, at a tapping temperature of about 1670° C., liquid pig iron at a temperature of 1250° C., with a carbon content of 4%, is introduced into the crucible 1. Thereupon, the content of the lowermost preheating section 17 is loaded into the crucible 1 by moving the grid portions 14 out of the preheater, the charge accumulating in a conical heap in the middle of the crucible 1 by virtue of the constriction between the scrap preheater 2 and the crucible 1. The sheet steel containers 22 which are filled with coal in grain form are pressed into the molten pig iron by the solid iron materials which lie on top of them, and the molten metal is urged to the edge of the crucible so that the oxygen nozzles are covered by the molten bath. The charging material from the preheating section 17 was heated to a temperature of above 850° C. in a preceding smelting process.

After the grid portions 14 have been moved into the preheater, the grid portions 15 and 16 are successively moved out and in in order to convey the charging material from the preheating sections 18 and 19 into the respective preheating section therebeneath. Then, after removal of the cover 13, the content of a charging basket into which the sheet steel containers 22 have been introduced beneath the solid iron materials is charged into the uppermost preheating section 19. After the vessel has been closed with the cover 13, the operation of injecting oxygen through the under-bath nozzles 5 is begun. The temperature of the molten bath is increased and the carbon content of the molten material is reduced by combustion of the carbon which is dissolved in the molten pig iron. When that happens, the sheet steel containers which are or which come into contact with the molten material are also correspondingly heated. At a temperature of about 1530° C., the steel sheet casing of the containers 22 melts and the solid carbon is dissolved in the bath. The carbon dissolves very quickly because of the high temperature and the low carbon content of the molten bath. As the coal which comes into contact with the molten material and which has already been freed of gases when subjected to the preheating operation in the charging material preheater, is pressed into the molten bath due to the solid iron materials applying a loading thereto, there is no risk of the carbon escaping upwardly out of the bath without being utilised, in conjunction with the high rate of dissolution of the carbon and the comparatively long path that it covers in the bath.

The CO-bearing waste gas from the molten bath is subject to post-combustion in order fully to utilise the energy contained in the fuel for the process, by means of the preheated air which is supplied through the nozzles 7 and which can be enriched with oxygen. The hot waste gases heat the charging material in the preheating sections to over 850° C.

The temperature of the waste gases after leaving the heat exchanger 8, is below 200° C.

During the operation of injecting oxygen, further solid materials such as powdered coal may be introduced through the solids nozzles 6 for short-term temperature control or analysis correction. The burners 11 may be used for supplying additional heat energy.

We claim:

1. A process of feeding heat energy into a molten metal bath formed by melting solid metal pieces in a crucible, comprising the steps of: charging solid carbon inside a plurality of sheet metal containers into the metal bath in the crucible, the sheet metal of the containers being selected such that the melting point thereof is within a range in which the solid metal pieces melt down; and pressing the sheet metal container down into the metal bath by means of solid metal pieces lying thereabove, while injecting oxygen into the metal bath.

2. A process according to claim 1, wherein the sheet metal containers are gas-permeable.

3. A process according to claim 1, wherein the sheet metal containers are heated prior to being pressed into the molten bath.

4. A process according to claim 3, wherein the sheet metal containers containing the carbon are heated to over 100° C.

5. A process according to claim 3, wherein the sheet metal containers containing the carbon are heated to a temperature close to the softening point of the sheet metal.

6. A process according to claim 1, wherein the sheet metal containers containing the carbon are heated in the crucible prior to being covered with molten metal.

7. A process according to claim 1, wherein the sheet metal containers containing the carbon are heated in a charging material preheater by hot waste gases from the crucible.

8. A process according to claim 7, comprising loading the sheet metal containers containing the carbon into a charging material preheater arranged above the crucible, and loading the solid metal pieces in the preheater onto the sheet metal containers, and subjecting CO-bearing waste gases from the molten metal bath to post-combustion before they pass into the preheater.

9. A process according to claim 1, wherein the sheet metal is iron and the solid metal pieces are iron or steel.

10. A process according to claim 1, wherein the sheet metal containers also contain alloying additives.

11. A process according to claim 1, wherein the sheet metal containers also contain a binding agent.

12. A process according to claim 1, wherein the sheet metal containers are of a volume of 0.5 to 50 dm$^3$.

13. A process according to claim 1, wherein the sheet metal containers are from 1 to 2 dm in thickness.

14. A process according to claim 1, wherein the sheet metal containers are of a gauge of from 0.5 to 5 mm.

15. A process according to claim 1, wherein the sheet metal containers are tubular elements closed at both ends thereof.

16. A process according to claim 1, comprising loading the sheet metal containers containing the carbon into the crucible such that they are remote from the direct action of the oxygen which is injected into the molten metal bath.

17. A process of feeding heat energy into a molten metal bath formed by melting solid metal pieces in a crucible, comprising the steps of: charging solid carbon into the metal bath inside a plurality of sheet metal containers, injecting oxygen into the metal bath, and controlling melting through of the sheet metal containers and thereby commencement of the carbon inside the containers by appropriately selecting the material and thickness of the sheet metal.

18. A process according to claim 17, wherein the material of the sheet metal containers consists of steel and the melting temperature of the sheet metal container is controlled through the carbon content of the steel.

19. A process according to claim 17, wherein the sheet metal containers consist of material which have different melting points and different gauges.

20. A process according to claim 18, wherein the material of the sheet metal and the sheet metal gauge are so selected that the sheet metal containers melt through only when the carbon content of the molten metal bath has fallen to less than 2% by weight and the temperature of the molten metal bath has reached at least 1400° C.

21. A process according to claim 19, wherein the material of the sheet metal and the sheet metal gauge are so selected that the sheet metal containers melt through only when the carbon content of the molten metal bath has fallen to less than 1% by weight and the temperature of the molten metal bath has reached at least 1500° C.

22. A process according to claim 17, wherein the material of the sheet metal and the sheet metal gauge are so selected that the sheet metal containers melt only after a predetermined residence time in the molten metal bath.

23. A process according to claim 22, wherein the residence time is at least 5 minutes.

* * * * *